United States Patent
Mueller et al.

(10) Patent No.: US 11,775,257 B2
(45) Date of Patent: Oct. 3, 2023

(54) ENHANCED LOW PRECISION BINARY FLOATING-POINT FORMATTING

(71) Applicant: International Business Machines Corporation, Armonk, NY (US)

(72) Inventors: Silvia Melitta Mueller, Altdorf (DE); Ankur Agrawal, White Plains, NY (US); Bruce Fleischer, Bedford Hills, NY (US); Kailash Gopalakrishnan, San Jose, CA (US); Dongsoo Lee, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/840,847

(22) Filed: Apr. 6, 2020

(65) Prior Publication Data
US 2020/0233642 A1    Jul. 23, 2020

Related U.S. Application Data

(63) Continuation of application No. 16/000,435, filed on Jun. 5, 2018, now Pat. No. 10,656,913.

(51) Int. Cl.
G06F 7/499    (2006.01)
(52) U.S. Cl.
CPC ...... G06F 7/49915 (2013.01); G06F 7/49968 (2013.01)
(58) Field of Classification Search
CPC ........................................ G06F 7/483
See application file for complete search history.

(56) References Cited

U.S. PATENT DOCUMENTS

| 4,831,575 A | 5/1989 | Kuroda |
| 5,944,774 A | 8/1999 | Dent |

(Continued)

FOREIGN PATENT DOCUMENTS

| CN | 101158892 A | 4/2008 |
| CN | 106570559 A | 4/2017 |

(Continued)

OTHER PUBLICATIONS

Office action received for GB application No. GB2019054.2 dated Jan. 12, 2021, 3 pages.

(Continued)

*Primary Examiner* — Michael D. Yaary
(74) *Attorney, Agent, or Firm* — Amin, Turocy & Watson, LLP

(57) ABSTRACT

Techniques for operating on and calculating binary floating-point numbers using an enhanced floating-point number format are presented. The enhanced format can comprise a single sign bit, six bits for the exponent, and nine bits for the fraction. Using six bits for the exponent can provide an enhanced exponent range that facilitates desirably fast convergence of computing-intensive algorithms and low error rates for computing-intensive applications. The enhanced format can employ a specified definition for the lowest binade that enables the lowest binade to be used for zero and normal numbers; and a specified definition for the highest binade that enables it to be structured to have one data point used for a merged Not-a-Number (NaN)/infinity symbol and remaining data points used for finite numbers. The signs of zero and merged NaN/infinity can be "don't care" terms. The enhanced format employs only one rounding mode, which is for rounding toward nearest up.

20 Claims, 10 Drawing Sheets

(56) References Cited

U.S. PATENT DOCUMENTS

| | | |
|---|---|---|
| 6,516,332 B1 | 2/2003 | Carter |
| 6,601,079 B1 | 7/2003 | Phillips |
| 6,650,327 B1 | 11/2003 | Airey et al. |
| 6,782,405 B1 * | 8/2004 | Matula ............... G06F 7/535 708/504 |
| 8,103,858 B2 | 1/2012 | Sperber et al. |
| 8,645,439 B2 | 2/2014 | Kinsman et al. |
| 9,104,510 B1 * | 8/2015 | Rub ............... G06F 7/5443 |
| 10,592,208 B2 * | 3/2020 | Wang ............... G06N 3/08 |
| 10,678,510 B2 | 6/2020 | Langhammer |
| 2002/0184282 A1 | 12/2002 | Yuval et al. |
| 2003/0093453 A1 | 5/2003 | Ruehle |
| 2008/0062743 A1 | 3/2008 | Mayer et al. |
| 2010/0174764 A1 | 7/2010 | Boersma et al. |
| 2014/0101215 A1 | 4/2014 | Ayoub et al. |
| 2017/0372202 A1 | 12/2017 | Ginsburg et al. |
| 2018/0121168 A1 | 5/2018 | Langhammer |
| 2018/0307971 A1 * | 10/2018 | Sinha ............... G06F 1/3293 |
| 2019/0171420 A1 * | 6/2019 | Malaya ............... G06N 3/063 |
| 2019/0339938 A1 * | 11/2019 | Wang ............... G06N 3/08 |

FOREIGN PATENT DOCUMENTS

| | | |
|---|---|---|
| CN | 107451658 A | 12/2017 |
| DE | 69801678 T2 | 1/2003 |
| DE | 69832519 T2 | 8/2006 |
| DE | 102009030525 A1 | 1/2010 |
| DE | 112017004287 T5 | 5/2019 |
| JP | 11195012 A | 7/1999 |
| WO | 9923548 A2 | 5/1999 |

OTHER PUBLICATIONS

Huynh, "Deep Neural Network Accelerator based on FPGA", 4th NAFOSTED Conference on Information and Computer Science, IEEE, 2017, pp. 254-257, 4 pages.

Hok, "Automatic Synthesis and Optimization of Floating Point Hardware," Thesis, The Chinese University of Hong Kong, Jul. 2003, 90 pages.

Nathan, "Using Runtime Floating Point Accuracy Feedback to Make Automated Precision/Performance Improvements or Tradeoffs," Thesis, Duke University, 2015, 188 pages.

Non-Final Office Action received for U.S. Appl. No. 16/000,435 dated Nov. 19, 2019, 14 pages.

International Search Report and Written Opinion for International Application Serial No. PCT/IB2019/054479 dated Sep. 25, 2019, 9 pages.

List of IBM Patents or Applications Treated as Related.

German Office Action for German Application No. 1120190017993 dated Jul. 1, 2021, 25 pages.

Notice of Reasons for Refusal for Japanese Patent Application No. 2020-552412, dated Aug. 24, 2022, 4 pages.

* cited by examiner

ENHANCED LOW PRECISION BINARY FLOATING-POINT FORMATTING

BACKGROUND

The subject disclosure relates to floating-point number formatting.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can facilitate forming electronic devices comprising spiral conductive structures are provided.

According to an embodiment, a system can comprise a memory that stores computer-executable components; and a processor, operatively coupled to the memory, that executes computer-executable components. The computer-executable components can comprise a calculator component that facilitates operation on and calculation of binary floating-point numbers by the processor in accordance with a defined floating-point number format, in connection with execution of an application, wherein the defined floating-point number format utilizes six bits in an exponent field.

Another embodiment relates to a computer-implemented method that can comprise generating, by a system operatively coupled to a processor, respective numerical fields in a defined floating-point number format, wherein the respective numerical fields comprise a sign field, an exponent field, and a mantissa field, wherein the defined floating-point number format utilizes six bits in the exponent field. The method can also comprise calculating, by the system, binary floating-point numbers in accordance with the defined floating-point number format, in connection with execution of an application.

A further embodiment relates to a computer program product that facilitates calculating floating-point numbers, the computer program product comprising a computer readable storage medium having program instructions embodied therewith. The program instructions are executable by a processor to cause the processor to create respective fields in a defined floating-point number format, wherein the respective fields comprise a sign field, an exponent field, and a fraction field, wherein the defined floating-point number format contains six bits for the exponent in the exponent field. The program instructions also are executable by the processor to cause the processor to calculate the floating-point numbers in accordance with the defined floating-point number format, in connection with utilization of an application.

Still another embodiment relates to a computer-implemented method that can comprise generating, by a system operatively coupled to a processor, respective numerical fields in a defined floating-point number format, wherein the respective numerical fields comprise a sign field, an exponent field, and a fraction field. The method also can comprise calculating, by the system, binary floating-point numbers in accordance with the defined floating-point number format, in connection with execution of an application, wherein the defined floating-point number format utilizes a binade to represent zero and normal numbers, wherein the binade is associated with bit values of bits of the exponent field being comprised of zeros.

These and other features will become apparent from the following detailed description of illustrative embodiments thereof, which is to be read in connection with the accompanying drawings.

DETAILED DESCRIPTION

Figure 1:
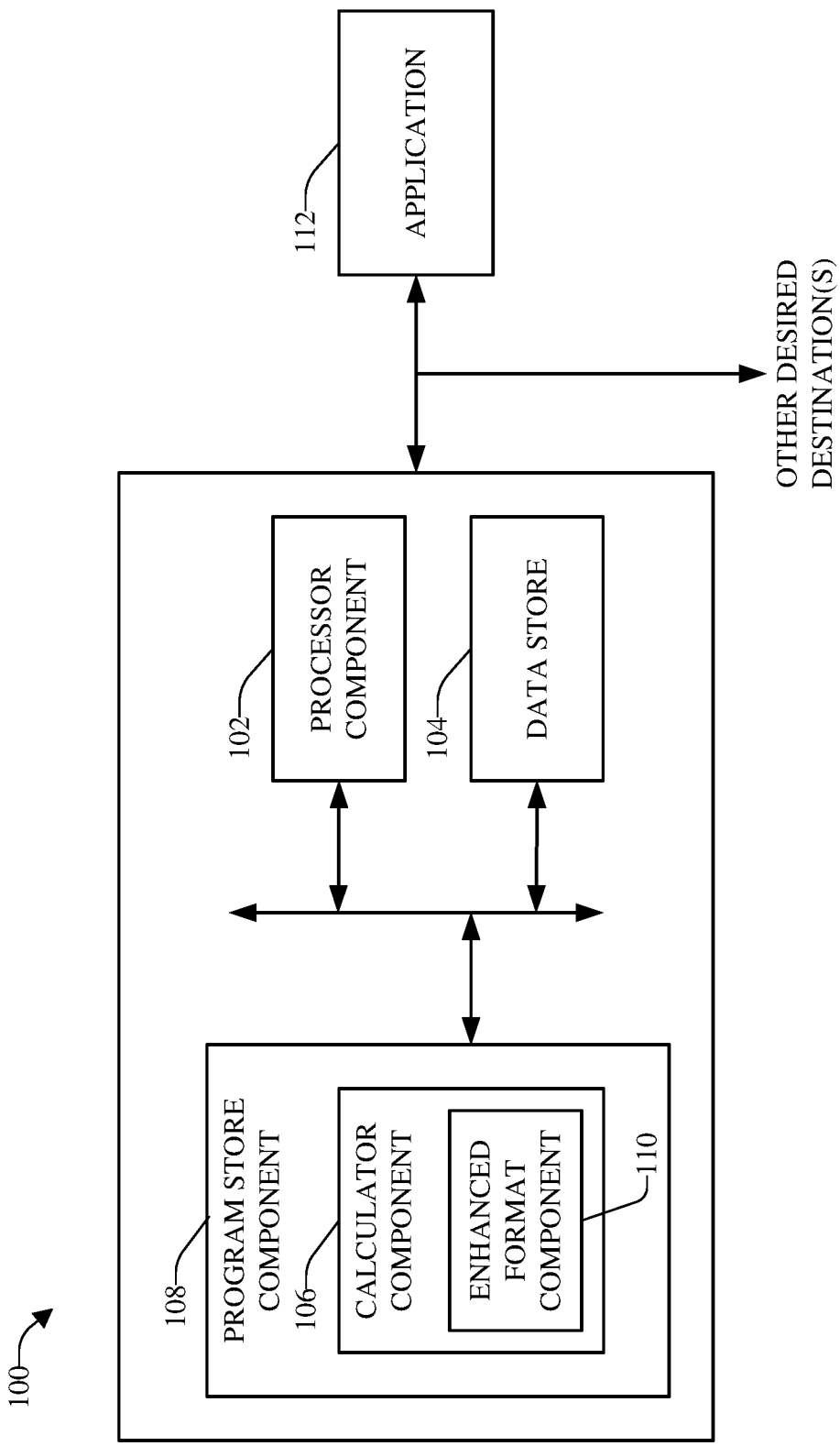
FIG. 1 illustrates a block diagram an example, non-limiting system that can be employed to operate on, generate, and/or calculate floating-point numbers using an enhanced floating-point number format, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Certain types of applications, such as, for example, deep learning applications, can have workloads that can be demanding with regard to resources (e.g., can be computationally demanding). For instance, training deep networks can take a significant amount of time (e.g., multiple days or weeks) even when using systems that comprise multiple graphics processing units (GPUs). Training algorithms for some deep learning benchmarks can take a significant amount of time (e.g., weeks) to converge on systems comprised of multiple GPUs.

Specialized accelerators can be useful to significantly speed up these types of applications. Such specialized accelerators that can provide relatively large throughput density for floating point computations, both in terms of area (e.g., throughput/millimeters$^2$ (mm$^2$) and power (throughput/watt), can be quite useful for future deep learning systems.

The use of double (e.g., 64-bit) precision and single (e.g., 32-bit) precision representations can be unnecessary and inefficient for cognitive computing workloads. One way to improve both the area and the power consumption metrics, with regard to heavy computing workloads, such as cognitive computing workloads, can be to use smaller bit-widths floating-point representations for performing the majority of computations. For instance, a relatively small portion of the computations, such as computations that can be relatively sensitive to rounding errors, can be performed using the single-precision format, while the majority of computations (e.g., computations that are not substantially sensitive to rounding errors) can be performed using a lower precision (e.g., 16-bit) format. Such a split of the computations between the single-precision format and the lower precision format can allow for the use of a desirable number (e.g., many) lower precision engines (e.g., using a lower precision format) and a relatively small number of higher precision engines (e.g., using a higher (e.g., single) precision format).

One way a lower precision (e.g., 16-bit) format can be structured is to have a 1/5/10 format (e.g., IEEE 754 half-precision (1/5/10) format) that can have a single sign bit, a 5-bit exponent, and a 10-bit mantissa that can be used as a data-interchange format. However, the 1/5/10 format can be unsuitable for applications with significant amounts of computations, particularly training of deep neural networks, because this format can have a relatively limited dynamic range. When the more critical calculations (e.g., calculations that are sensitive to rounding errors) are performed using single-precision format, and the majority of calculations are performed using the 1/5/10 format, the quality of the trained network is significantly degraded, as compared to baseline of a number of benchmark applications. For example, when using a 1/5/10 format for the majority of calculations during training, for Watson Natural Language training, the accuracy fell below a 60% benchmark for suitability (e.g., indicating the accuracy was not suitable), and for AlexNet Image Classification training, the calculations did not converge at all.

For improved throughput density though, it can be desirable to use lower precision (e.g., 16-bit) floating-point arithmetic. However, for the use of a lower precision floating-point number format to be feasible (e.g., in applications with significant amounts of computations, such as training of deep neural networks and other deep learning training), it can be desirable to have the lower precision floating-point number format allow fast enough convergence of the programs and algorithms associated with computing-intensive applications and small enough error rates for computing-intensive applications, such as, for example, machine training and deep learning training tasks.

The various embodiments described herein relate to operating on, generating, and calculating floating-point numbers (e.g., binary floating-point numbers) using an enhanced floating-point number format (e.g., an enhanced lower precision floating-point number format). The enhanced floating-point number format can be sufficient for a wide range of machine training and deep learning training tasks, and can allow for an area and power efficient implementation of a fused-multiply-add 16-bit floating point unit (a fused-multiply-add 16-bit FPU). The enhanced floating-point number format (e.g., enhanced lower precision (e.g., 16-bit) floating-point number format) can have a 1/6/9 format that can have a single sign bit, a 6-bit exponent, and a 9-bit mantissa that can be used as an arithmetic computation format as well as a data-interchange format. As compared to a 1/5/10 format, the enhanced floating-point number format can have one more exponent bit and the fraction can be one bit less. The six bits for the exponent, with the extra (e.g., 6th) exponent bit, of the enhanced floating-point number format can provide an extra exponent range that can be desirable in order to have machine training and deep learning training algorithms converge sufficiently fast enough, and the enhanced floating-point number format also can have desirably low error rates for computing-intensive applications, such as machine training and deep learning applications and associated tasks.

The enhanced floating-point number format also can employ a specified definition for the lowest binade (e.g., data points with the exponent field being all zeros). Other floating-point number formats (e.g., lower precision floating-point number formats), such as the 1/5/10 format, can use the lowest binade for subnormal numbers and zero. In contrast, in accordance with the specified definition of the lowest binade in the enhanced floating-point number format, the lowest binade can be used for zero and normal numbers. With the exponent field of the enhanced floating-point number format being one-bit wider than the 1/5/10 format, the enhanced floating-point number format (e.g., 1/6/9 format) can get closer to a value of 0 even with normal numbers in the last binade than the 1/5/10 format can with subnormal numbers. Hardware support for subnormal numbers can be relatively costly and can add to the depth (e.g., total gate delay) of a typical fused-multiply-add floating-point unit. The disclosed subject matter, by employing the specified definition for the lowest binade, can avoid using subnormal numbers, which can result in the disclosed subject matter being more efficient with regard to hardware use and support, and can avoid adding to the depth (e.g., total gate delay) of a fused-multiply-add 16-bit FPU, as compared to other formats, such as the 1/5/10 format.

The enhanced floating-point number format also can utilize a specified definition for the highest binade (e.g., data points with the exponent field being all ones). Certain other floating-number formats use the highest binade only for special values, such as not-a-number (NaN) and infinity. In contrast, in some embodiments, in accordance with the specified definition of the highest binade in the enhanced floating-point number format, a desired portion (e.g., most) of the highest binade can be used for finite numbers and one data point of the highest binade can be used for special values, such as NaN and infinity (e.g., merged NaN/infinity). The enhanced floating-point number format, by utilizing such specified definition for the highest binade, can allow a relatively larger data range and can utilize relatively less complex hardware, as compared to other floating-point number formats (e.g., lower precision floating-point number formats), such as the 1/5/10 format, since, among other reasons, the logic employed for the enhanced floating-point number format does not have to distinguish between the NaN and infinity values.

In some embodiments, the enhanced floating-point number format can define the sign of zero as being a "don't care" term, which can make the handling of the sign of zero less complex, as compared to other floating-point number formats, such as the 1/5/10 format. For instance, other formats like the 1/5/10 format can have relatively complicated rules regarding how to obtain the sign of zero. However, for many applications, such as, for example, deep learning applications, the sign of zero does not matter. The enhanced floating-point number format can account for the sign of zero not mattering in such applications, wherein, in the enhanced floating-point number format, the sign of zero can be a "don't care" term. For instance, when a floating-point number is zero, an arbitrary value can be generated (e.g., by a processor component or calculator component) for the sign field to represent the term or symbol for the sign of the value of zero. Any arbitrary value or symbol that is convenient or efficient (e.g., most convenient or most efficient) for the system (e.g., the processor component or calculator component) to generate can be generated and inserted in the sign field. This can enable the hardware and logic utilized in connection with the enhanced floating-point number format to be relatively less complex, and less hardware and hardware resources (and less logic resources) can be utilized, than the hardware used for other floating-point number formats (e.g., the 1/5/10 format).

In certain embodiments, the enhanced floating-point number format can define the sign of the merged NaN/infinity symbol as a "don't care" term, which can make the handling of the sign of merged NaN/infinity symbol relatively less complex, as compared to how the sign of NaN and infinity is handled in other formats (e.g., the 1/5/10 format). For instance, certain other formats can have relatively complicated rules regarding how to obtain the sign of NaN and infinity, particularly for add/subtract and multiply-add operations. However, for many applications, including deep learning applications, the sign of NaN and infinity does not matter. With this being the case, in the enhanced floating-point number format, the sign of the merged NaN/infinity symbol can be a "don't care" term. For example, when a floating-point number is NaN or infinity, an arbitrary value can be generated (e.g., by a processor component or calculator component) for the sign field to represent the term or symbol for the sign of the merged NaN/infinity symbol. Any arbitrary value or symbol that is convenient or efficient (e.g., most convenient or most efficient) for the system (e.g., the processor component or calculator component) to generate can be generated and inserted in the sign field associated with the merged NaN/infinity symbol. This can enable the hardware and logic utilized in connection with the enhanced floating-point number format to be relatively less complex, and less hardware and hardware resources (and less logic resources) can be utilized, than the hardware used for other formats (e.g., the 1/5/10 format).

The enhanced floating-point number format also can employ a rounding mode that can be less complex to implement than the rounding modes utilized by other types of formats, like the 1/5/10 format. For instance, the enhanced floating-point number format can employ a single rounding mode, which can be for rounding toward nearest up. Some other types of formats (e.g., the 1/5/10 format) can employ more complex rounding modes, such as rounding to nearest up, rounding to nearest down, or rounding to even, rounding towards 0, rounding towards +infinity, and rounding towards −infinity. Use of a single and relatively less complex rounding mode, such as the round-to-nearest-up rounding mode, by the enhanced floating-point number format can have no, or at least virtually no, impact on performance of workloads, including speed of performance and quality of training of systems (e.g., machine training or deep learning training), while significantly reducing the amount of hardware and logic used for rounding floating-point numbers.

These and other aspects and embodiments of the disclosed subject matter will now be described with respect to the drawings.

FIG. 1 illustrates a block diagram an example, non-limiting system 100 that can be employed to operate on, generate, and/or calculate floating-point numbers (e.g., binary floating-point numbers) using an enhanced floating-point number format, in accordance with various aspects and embodiments of the disclosed subject matter. The enhanced floating-point number format of the system 100 can be sufficient for a wide range of machine learning or deep learning training tasks, and can allow for an area and power efficient implementation of a fused-multiply-add 16-bit floating point unit (fused-multiply-add 16-bit (FPU)). In accordance with various embodiments, the system 100 can comprise, be part of, or be associated with one or more fused-multiply-add 16-bit FPUs.

The enhanced floating-point number format (e.g., enhanced lower precision (e.g., 16-bit) floating-point number format) can comprise a 1/6/9 floating-point number format that can have a single sign bit, a 6-bit exponent, and a 9-bit mantissa that can be used as an arithmetic computation format as well as a data-interchange format. In part, by using six bits for the exponent (e.g., as opposed to using five bits for the exponent), the enhanced floating-point number format can provide an extra exponent range that can be desirable in order to have machine learning algorithms, deep learning training algorithms, and/or other computing-intensive algorithms converge sufficiently fast enough, and the enhanced floating-point number format also can have desirably low error rates for computing-intensive applications (e.g., machine training or deep learning applications). Other aspects and embodiments of the enhanced floating-point number format are described more fully herein.

The system 100 can comprise a processor component 102 that can be associated with a data store 104 and a calculator component 106. The processor component 102 can work in conjunction with the other components (e.g., data store 104, calculator component 106, . . . ) to facilitate performing the various functions of the system 100. The processor component 102 can employ one or more processors, microprocessors, or controllers that can process data, such as information relating to the enhanced floating-point number format, operating on, generating and/or calculating floating-point numbers, applications (e.g., machine learning, deep learning, or cognitive computing applications), machine or system training, parameters relating to number formatting or calculations, data traffic flows (e.g., between components or devices, and/or across a network(s)), algorithms (e.g., application-related algorithms, enhanced floating-point number formatting algorithm(s), floating-point number calculating algorithm, number rounding algorithm, . . . ), protocols, policies, interfaces, tools, and/or other information, to facilitate operation of the system 100, as more fully disclosed herein, and control data flow between components of the system 100, control data flow between the system 100 and other components or devices (e.g., computers, computer networking devices, data sources, applications, . . . ) associated with the system 100. In some embodiments, the processor component 102 can comprise one or more FPUs, such as one or more fused-multiply-add 16-bit FPUs.

The data store 104 can store data structures (e.g., user data, metadata), code structure(s) (e.g., modules, objects, hashes, classes, procedures) or instructions, information relating to the enhanced floating-point number format, operating on, generating and/or calculating floating-point numbers, applications (e.g., machine learning, deep learning, or cognitive computing applications), machine or system training, parameters relating to number formatting or calculations, data traffic flows, algorithms (e.g., application-related algorithms, enhanced floating-point number formatting algorithm(s), floating-point number calculating algorithm, number rounding algorithm, . . . ), protocols, policies, interfaces, tools, and/or other information, to facilitate controlling operations associated with the system 100. In an aspect, the processor component 102 can be functionally coupled (e.g., through a memory bus or other bus) to the data store 104 in order to store and retrieve information desired to operate and/or confer functionality, at least in part, to the calculator component 106 and/or other components of the system 100, and/or substantially any other operational aspects of the system 100.

The processor component 102 also can be associated with (e.g., communicatively and/or functionally connected to) a program store component 108 (e.g., via a bus(es)), wherein the program store component 108 can comprise (e.g., can store) the calculator component 106. The program store component 108 can store machine-executable (e.g., computer-executable) components or instructions, which can be accessed by the processor component 102 for execution by the processor component 102. For example, the processor component 102 can access the calculator component 106 in the program store component 108 and can utilize the calculator component 106 in connection with the processor component 102 performing operations on data (e.g., binary floating-point numbers), in accordance with the enhanced floating-point number format, as more fully described herein.

For instance, the processor component 102 and calculator component 106 can operate (e.g., operate in conjunction with each other) to perform operations on data, including operating on (e.g., performing mathematical computations on), generating, and/or calculating floating-point numbers (e.g., binary floating-point numbers) in accordance with (e.g., using) the enhanced floating-point number format (e.g., the 1/6/9 floating-point number format) of the enhanced format component 110. In some embodiments, the processor component 102 and/or calculator component 106 can operate on, generate, and/or calculate floating-point numbers using the enhanced floating-point number format of the enhanced format component 110 to facilitate machine training, deep learning training, cognitive computing, and/or other computing-intensive tasks, operations, or applications. For example, the processor component 102 and/or calculator component 106 can operate on, generate, and/or calculate floating-point numbers using the enhanced floating-point number format to facilitate obtaining results that can relate to a solution of a problem (e.g., cognitive-computing problem) to be solved in connection with machine or deep learning training. For instance, a problem to be solved can relate to machine training, deep learning, cognitive computing, artificial intelligence, neural networks, and/or other computing-intensive tasks, problems, or applications. As a few non-limiting examples, the problem can relate to image recognition to recognize or identify objects (e.g., person, place, and/or thing) in an image(s) or video, speech recognition to recognize or identify words and/or identities of voices in audio content (e.g., speech, broadcast with audio, song, and/or a program with audio), or textual recognition to recognize or identify textual data (e.g., words, alphanumeric characters) in textual content (e.g., book, manuscript, email, or set of documents, . . . ).

The processor component 102 and calculator component 106 can be associated with one or more applications (e.g., machine training or deep learning applications), such as application 112, to perform operations on data associated with the application(s) 112. For instance, the processor component 102 and calculator component 106 can receive data from an application 112, can generate or determine (e.g., calculate) numerical results (e.g., binary floating-point numbers), based at least in part on the data, in accordance with the enhanced floating-point number format, and can provide the numerical results to the application 112 and/or to another desired destination.

Figure 2:
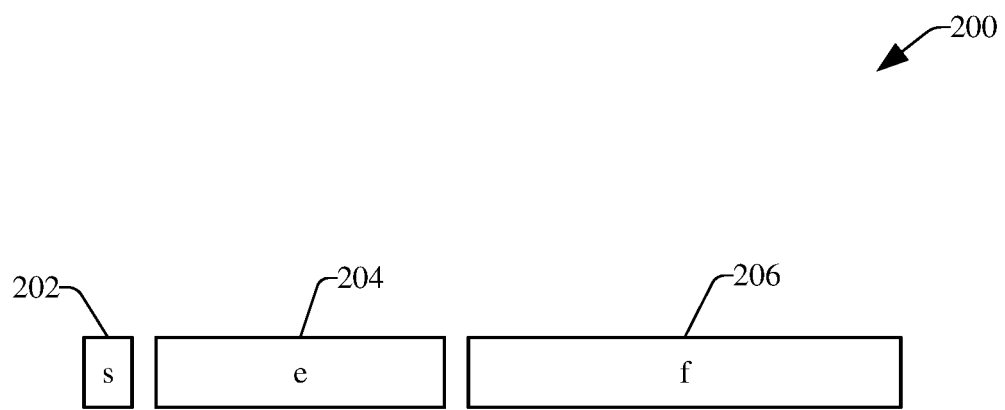
FIG. 2 depicts a block diagram of an example enhanced bit structure of the enhanced floating-point number format, in accordance with various aspects and embodiments of the disclosed subject matter.

Referring briefly to FIG. 2 (along with FIG. 1), FIG. 2 depicts a block diagram of an example enhanced bit structure 200 of the enhanced floating-point number format, in accordance with various aspects and embodiments of the disclosed subject matter. The enhanced bit structure 200 can comprise a sign (s) field 202 that can include one bit of data that can represent the sign of the floating-point number (e.g., binary floating-point number).

The enhanced bit structure 200 also can include an exponent (e) field 204 that can be adjacent to the sign field 202. The exponent field 204 can comprise six bits of data that can represent the exponent of the floating-point number. The enhanced floating-point number format, by employing the extra (e.g., 6th) exponent bit (e.g., as compared to the 1/5/10 format), can provide an enhanced (e.g., improved or extra) exponent range that can be desirable in order to have machine training or deep learning training algorithms (e.g., single-precision (e.g., 32-bit) machine training or deep learning algorithms being operated in a half-precision (e.g., 16-bit) mode) converge sufficiently fast enough, while also achieving relatively small error rates for computing-intensive applications, such as, for example, machine training and deep learning training applications and associated machine training and deep learning tasks.

The enhanced bit structure 200 further can include a fraction (f) field 206 that can be adjacent to the exponent field 204. The fraction field 206 can comprise nine bits of data that can represent the fraction (e.g., fractional value) of the floating-point number. The nine bits in the fraction for the enhanced floating-point number format is sufficient to provide the desired fraction precision for machine training algorithms, deep learning algorithms, and/or other computing-intensive algorithms (e.g., single-precision (e.g., 32-bit) machine training, deep learning, or other computing-intensive algorithms being operated in a half-precision (e.g., 16-bit) mode), even though the nine bits in the fraction is one less than the 1/5/10 format. It also is noted that, if there were only eight bits in the fraction (e.g., eight bits in the fraction with seven bits in the exponent), the eight bits in the fraction would not provide sufficient fraction precision for use with machine training algorithms or deep learning algorithms (e.g., single-precision machine training or deep learning algorithms being operated in half-precision mode) without at least some modifications to such algorithms, if such algorithm modifications would even be possible.

The value of a number x=(s,e,f) can be defined as $$\text{value}(x)=(-1)^s*2^{[e]}*(i.f), \quad \text{(Equation (1))}$$

wherein [e] can be the value of the biased exponent, and (i.f) can be the binary mantissa or significand, with f being the fraction and i being the implied bit. In accordance with the enhanced floating-point number format, the value of i can be 1 for all finite non-zero numbers (and can be 0 for true zero). With the enhanced floating-point number format using a biased exponent, the bias can allow the exponent to be represented as an unsigned binary integer.

Table 1 illustrates various differences between the enhanced floating-point number format (also referred to herein as an enhanced 1/6/9 format) and the 1/5/10 format.

TABLE 1

|  | 1/5/10 format | enhanced 1/6/9 format |
|---|---|---|
| Exponent field | 5 bits | 6 bits |
| Exponent bias | 15 | 31 |
| Smallest exponent | −14 | −31 |
| Largest exponent | +15 | +32 |
| Smallest positive number | $2^{-24}$ | $2^{-31} * (1 + 2^{-9})$ |
| Largest positive number | $2^{15}(2 - 2^{-10})$ | $2^{32} * (2 - 2^{-9})$ |

As can be seen from Table 1, using the enhanced floating-point number format of the enhanced format component 110, the smallest representable positive number is $2^{-31}*(1+2^{-9})$, which is a significantly smaller number than the smallest positive subnormal number (e.g., $2^{-24}$) that can be obtained using the 1/5/10 format. Thus, even without using subnormal numbers in the enhanced floating-point number format, the processor component 102 and calculator component 106 can utilize the enhanced floating-point number format to generate or calculate numbers that can be significantly closer to the value of 0 than when a 1/5/10 format is used. This can facilitate improving convergence of machine learning (e.g., deep learning) training runs.

With regard to floating-point numbers, there can be a set of binades, wherein a binade can be a set of binary floating-point values where each of the binary floating-point values of such set can have the same exponent. The enhanced floating-point number format can comprise 64 binades. The binades of the enhanced floating-point number format can include a first binade and a last binade. For the first (e.g., lowest) binade, the exponent field 204 can be all zeros (e.g., each of the 6 bits is a 0), and, for the last binade, the exponent field 204 can be all ones (e.g., each of the 6 bits is a 1). The enhanced floating-point number format of the enhanced format component 110 can employ respective specified definitions for the data points in the first binade and last binade, wherein such specified definitions for the data points in the first binade and last binade can be different from definitions used with regard to data points for the first and last binades of other formats, such as the 1/5/10 format.

The other binades, which can have non-extreme exponents (e.g., exponents that are not made up of all ones or all zeros), can be utilized to represent normal numbers. The implied bit can be one (i=1), which can result in a mantissa of 1.f. The exponent value of the exponent field 204 can be derived as [e]=e−bias. As disclosed, the enhanced floating-point number format can be different from the 1/5/10 format, in part, due to the exponent in the exponent field 204 being one bit wider than the 1/5/10 format, the fraction in the fraction field 206 being one bit shorter than the 1/5/10 format, and also the bias for the enhanced floating-point number format can be different from the 1/5/10 format.

Figure 3:
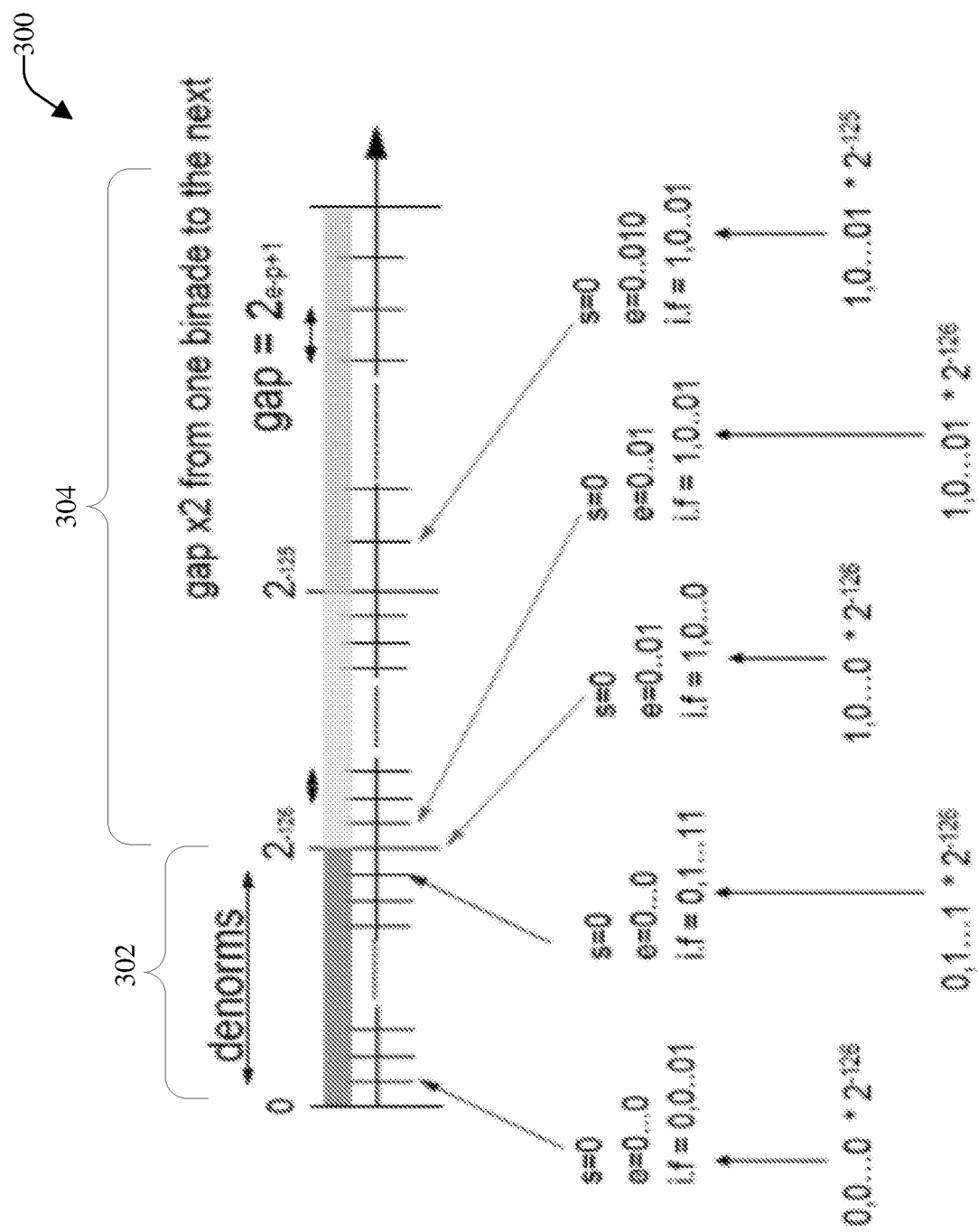
FIG. 3 presents a diagram of an example number line that can illustrate the locations of denormal numbers and normal numbers along the number line when denormal numbers are utilized in a floating-point number format, in accordance with various aspects and embodiments of the disclosed subject matter.

The use of subnormal (e.g., denormal) numbers in a floating-point number format, particularly a half-precision (e.g., 16-bit) floating-point number format, can be inefficient and/or relatively costly, as more fully disclosed herein. Referring briefly to FIG. 3 (along with FIGS. 1 and 2), FIG. 3 presents a diagram of an example number line 300 that can illustrate the locations of denormal numbers and normal numbers along the number line when denormal numbers are utilized in a floating-point number format, in accordance with various aspects and embodiments of the disclosed subject matter. As illustrated in the number line 300, with regard to a floating-point number format, such as a 32-bit (e.g., 1/8/23) floating-point number format, a first subset of numbers 302, which can be denormal numbers (denorms) (also referred to herein as subnormal numbers), can range from greater than 0 to $2^{126}$. In the 1/8/23 format, there can be a single bit for the sign field, 8 bits for the exponent field, and 23 bits for the fraction field. The first subset of numbers 302 can be in a first binade. As also illustrated in the number line 300, a second subset of numbers 304, which can be normal numbers, can be numbers that are greater than $2^{-126}$.

As disclosed herein, with the enhanced floating-point number format, the smallest representable positive number can be $2^{-31}*(1+2^{-9})$ (e.g., $(2^{-31}*(1+2-9))\rightarrow$0x0001), which is a significantly smaller number than the smallest positive subnormal number (e.g., $2^{-24}$) that can be obtained using the 1/5/10 format. By employing 6 bits in the exponent field, the enhanced floating-point number format can represent a range of number values expected or projected to be encountered during the execution of an application(s) 112 (e.g., machine or deep learning application) without the use of subnormal number modes. In accordance with various embodiments, the enhanced floating-point number format can accordingly eliminate the use of subnormal (e.g., denormal) numbers. Effectively, the enhanced floating-point number format is able to represent a wider range of numbers, while also having lower logical complexity, as compared to the 1/5/10 format.

With further regard to the lowest (e.g., first) binade, the enhanced floating-point number format can employ a specified definition for data points of the lowest binade (e.g., data points where the exponent field is all zeros). Under the specified definition of the lowest binade in the enhanced floating-point number format, the processor component 102 and/or calculator component 106 can utilize the lowest binade for zero and normal numbers, while eliminating subnormal numbers. For a zero fraction, the value can be zero. For a non-zero fraction, the value can be a non-zero normal number. With the smallest positive number represented being $(2^{-31}*(1+2^{-9}))$ with regard to the enhanced floating-point number format, the processor component 102 and/or calculator component 106 can perform rounding numbers smaller than $(2^{-31}*(1+2^{-9}))$ to either $(2^{-31}*(1+2^{-9}))$ or 0, in accordance with the enhanced floating-point number format.

Also, in accordance with the enhanced floating-point number format, the sign can be ignored, which can enable hardware implementations to be less complex and more efficient than other systems or devices that use other floating-point number formats (e.g., 1/5/10 format). For example, when the processor component 102 and/or calculator component 106 generate or calculate a zero result, the value of the sign bit can be undefined or implementation specific. For instance, zero can be 0x0000 or 0x8000, wherein the sign bit can be represented as a "don't care" term. When the processor component 102 and/or calculator component 106 operate on, generate, or calculate a non-zero fraction, the value can be a normal number, wherein, for example, the implied bit can be one (i=1), which can result in a mantissa of 1.f, and wherein the exponent value can be [e]=e-bias=0-bias.

As stated, the enhanced floating-point number format can define the sign of zero as being a "don't care" term, which can make the handling of the sign of zero less complex, as compared to other formats, such as the 1/5/10 format. For instance, certain other floating-point number formats, such as the 1/5/10 format, can have relatively complicated rules regarding how to obtain the sign of zero. However, for many applications, including deep learning applications, the sign of zero does not matter. Thus, in accordance with the enhanced floating-point number format, the processor component 102 and/or calculator component 106 can represent the sign of zero as a "don't care" term. For example, the "don't care" term can represent a defined value that can indicate that the sign of zero does not matter with respect to the value of zero, in accordance with the enhanced floating-point number format. When the floating-point number is zero, the processor component 102 and/or calculator component 106 can generate any arbitrary value or symbol in the sign field of the enhanced floating-point number format that is convenient or efficient (e.g., most convenient or most efficient) for the processor component 102 or calculator component 106 to generate and insert in the sign field. For example, the processor component 102 and/or calculator component 106 can generate or facilitate generating an arbitrary value that can utilize the least amount of resources (e.g., processing or computing resources), or at least can utilize less resources than would otherwise be used, to determine and generate a non-arbitrary value for the sign field to represent the sign of the value of zero. The disclosed subject matter, by employing the enhanced floating-point number format, including its treatment of the sign associated with the value of zero, can thereby enable the hardware utilized by the system 100 in connection with the enhanced floating-point number format to be relatively less complex, and less hardware and hardware resources (and less logic resources) can be utilized, than the hardware used for other floating-point number formats (e.g., the 1/5/10 format).

Also, in contrast to the enhanced floating-point number format, certain other floating-number formats, such as the 1/5/10 format, use the lowest binade for subnormal (e.g., denormal) numbers and zero. As disclosed herein, with the exponent field of the enhanced floating-point number format being one-bit wider than the 1/5/10 format, the enhanced floating-point number format can get closer to a value of 0 even with normal numbers in the last binade than the 1/5/10 format can with subnormal numbers.

Hardware support for subnormal numbers can be relatively costly and can add to the depth (e.g., total gate delay) of a typical fused-multiply-add FPU, and further support for subnormal numbers can undesirably increase logic complexity. The disclosed subject matter, by employing such specified definition for the lowest binade, can avoid using subnormal numbers, which can result in the disclosed subject matter being more efficient with regard to hardware use and support (e.g., can reduce the amount of hardware and hardware resources used), and can avoid adding to the depth (e.g., total gate delay) of a fused-multiply-add FPU, as compared to other floating-point number formats, such as the 1/5/10 format.

With further regard to the highest (e.g., last) binade, the enhanced floating-point number format can utilize a specified definition for the highest binade (e.g., data points with regard to an exponent field being all ones). In accordance with the specified definition of the highest binade in the enhanced floating-point number format, the processor component 102 and/or calculator component 106 can use a desired portion (e.g., most) of the highest binade for finite numbers and can use one data point of the highest binade for special values, such as not-a-number (NaN) and infinity (e.g., merged NaN/infinity).

Table 2 illustrates the use of most (e.g., all but one data point) of the highest binade for finite numbers and one data point of the highest binade for the special value for merged NaN/infinity, in accordance with some embodiments of the disclosed subject matter, as follows:

TABLE 2

| Exponent | Mantissa | |
|---|---|---|
| 111111 | 000 . . . 000 to 111 . . . 110 | Normal numbers with mantissa 1.f and [e] = 32 |
| 111111 | 111 . . . 111 | Merged NaN/Infinity (sign bit can be a "don't-care" term) |

It is to be appreciated and understood that, in accordance with various other embodiments, more mantissa codes for different flavors of NaN can be reserved and accordingly utilized by the processor component 102 and/or calculator component 106. For example, if and as desired, two or more mantissa codes can be employed (e.g., by the processor component 102 and/or calculator component 106) for respective (e.g., different) flavors of NaN, in accordance with the enhanced floating-point number format. As another example embodiment, if and as desired, with the exponent being 111111, and for a mantissa ranging from 000 . . . 000 to 111 . . . 101, the data points can be normal numbers, with mantissa Wand [e]=32; for a mantissa of 111 . . . 110, the data point can represent + or − infinity, depending on the value of the sign bit in the sign field 202; and for a mantissa of all 1 values, the data point can represent NaN, wherein the sign bit in the sign field 202 can be a "don't care" term.

The enhanced floating-point number format also can define the sign of the merged NaN/infinity symbol as a "don't care" term, which can make the handling of the sign of merged NaN/infinity symbol relatively less complex, as compared to how the sign of NaN and infinity is handled in other floating-point number formats (e.g., the 1/5/10 format). For instance, certain other floating-point number formats can have relatively complicated rules regarding how to obtain the sign of NaN and infinity, particularly for add/subtract and multiply-add operations. However, for many applications, including deep learning applications, the sign of NaN and infinity does not matter.

Thus, in accordance with the enhanced floating-point number format, the processor component 102 and/or calculator component 106 can represent the sign of the merged NaN/infinity symbol as a "don't care" term. For example, the "don't care" term can represent a defined value that can indicate that the sign of the merged NaN/infinity symbol does not matter with respect to the value of the merged NaN/infinity symbol, in accordance with the enhanced floating-point number format. When infinity or NaN is the floating-point number result, the processor component 102 and/or calculator component 106 can generate or facilitate generating the arbitrary value in the sign field associated with the value(s) for infinity and/or NaN (e.g., merged NaN/infinity symbol, individual NaN value, or individual infinity value) to represent the term or symbol for the sign of the value of the value(s) for infinity and/or NaN. In accordance with the enhanced floating-point number format, the processor component 102 and/or calculator component 106 can generate or facilitate generating any arbitrary value or symbol in the sign field associated with the value(s) for infinity and/or NaN that is convenient or efficient (e.g., most convenient or most efficient) for the processor component 102 or calculator component 106 to generate and insert in such sign field. For example, the processor component 102 and/or calculator component 106 can generate or facilitate generating an arbitrary value that can utilize the least amount of resources (e.g., processing or computing resources), or at least can utilize less resources than would otherwise be used, to determine and generate a non-arbitrary value for the sign field to represent the sign of the value(s) for infinity and/or NaN. The disclosed subject matter, by employing the enhanced floating-point number format, including its treatment of infinity, NaN, and the sign associated with infinity and NaN, can thereby enable the hardware utilized by the system 100 in connection with the enhanced floating-point number format to be relatively less complex, and less hardware and hardware resources (and less logic resources) can be utilized, than the hardware used for other floating-point number formats (e.g., the 1/5/10 format).

Further, in contrast to the specified definition for the highest binade under the enhanced floating-point number format, certain other floating-number formats, such as the 1/5/10 format, use the highest binade exclusively for the special values of NaN and infinity, wherein for a zero fraction, the value can be +/− infinity, depending on the sign bit, and for a non-zero fraction, the data point can represent a NaN. Those special values can be somewhat useful for handling corner conditions. Infinity can be used to indicate that the calculation did overflow the valid data range. In arithmetical operations, infinity can obey the rules of algebra, such as, for example, infinity−x=infinity for any finite number x. In such certain other floating-point formats, NaN can be used to represent mathematically undefined scenarios, such as, for example, the square root of a negative number or the difference between two infinites with the same sign. It is noted that, in floating-number formats, such as the 1/5/10 format, there can be multiple representations of the NaN. When an arithmetical operation has at least one NaN operand, the result has to be one of the operand NaN, for example, its payload has to be passed on.

While using one binade exclusively for these special values of NaN and infinity typically can not be a significant penalty when having 8 or more bits for the exponent, such as, for example, with regard to higher precision floating-point number formats (e.g., 32-bit or 64-bit floating-point number formats), using one binade exclusively for these special values of NaN and infinity can be unacceptably expensive for smaller bit widths, such as the smaller bit widths associated with the lower precision floating-point number formats (e.g., 16-bit floating-point number formats, such as the enhanced 1/6/9 format and the 1/5/10 format).

The enhanced floating-point number format, by utilizing such specified definition for the highest binade described herein, can allow a relatively larger data range and can utilize relatively less complex hardware, as compared to other floating-point number formats, such as the 1/5/10 format, since the logic employed by the system 100 (e.g., by the processor component 102 and/or calculator component 106) for the enhanced floating-point number format does not have to distinguish between the NaN and infinity values.

In some embodiments, the enhanced floating-point number format can employ a rounding mode that can be less complex to implement than the rounding modes utilized by other types of formats. For instance, the enhanced floating-point number format can employ a rounding mode for rounding toward nearest up without utilizing other rounding modes. Some other types of formats (e.g., the 1/5/10 format) employ more complex rounding modes, such as rounding to nearest up, rounding to nearest down, and rounding to even, as well as rounding towards 0, rounding towards +infinity, and rounding towards −infinity. Use of the less complex rounding mode (e.g., rounding to nearest up), without utilizing other rounding modes, by the enhanced floating-point number format can have no, or at least virtually no, impact on performance of workloads, including speed of performance and quality of training of systems (e.g., machine or deep learning training), while significantly reducing the amount of hardware and logic used for rounding floating-point numbers.

The disclosed subject matter, by employing the enhanced floating-point number format, can facilitate significantly reducing the amount of hardware, hardware resources, logic resources, and other computing-related resources utilized for computing-intensive applications (e.g., machine training or deep learning training applications), for example, as more fully described herein. In some embodiments, the disclosed subject matter, by employing the enhanced floating-point number format, also can employ a 16-bit FPU that can be approximately 25 times smaller than certain double-precision (e.g., 64-bit) FPUs. Further, the disclosed subject matter, by employing the enhanced floating-point number format, is expected (e.g., estimated or projected) to employ a 16-bit FPU that can be approximately 25% to 30% smaller than a comparable half-precision (e.g., 16-bit) FPU (e.g., half-precision FPU using the 1/5/10 format).

Figure 4:
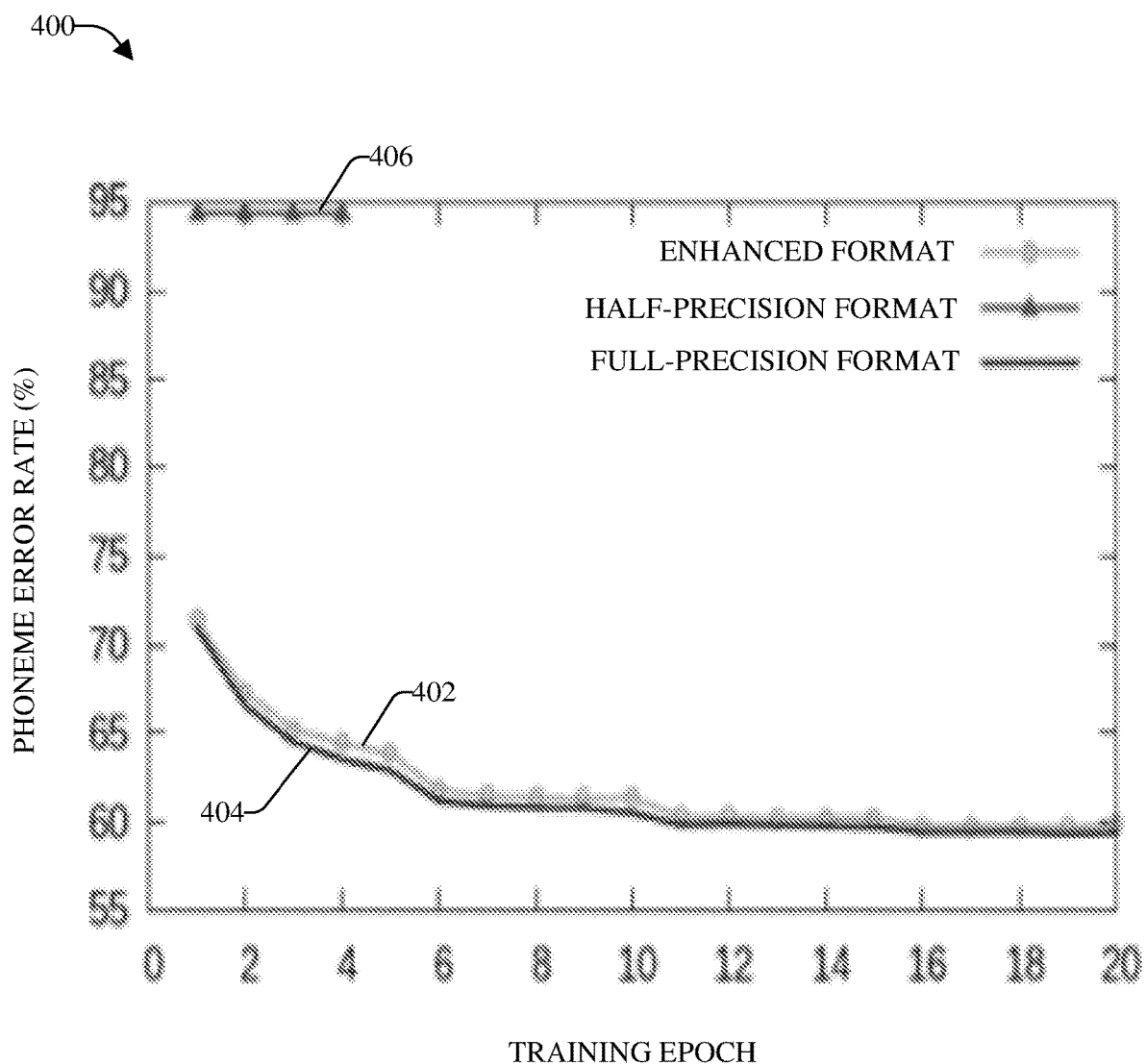
FIG. 4 depicts a diagram of an example graph of performance results relating to speech recognition, in accordance with various aspects and embodiments of the disclosed subject matter.
Figure 5:
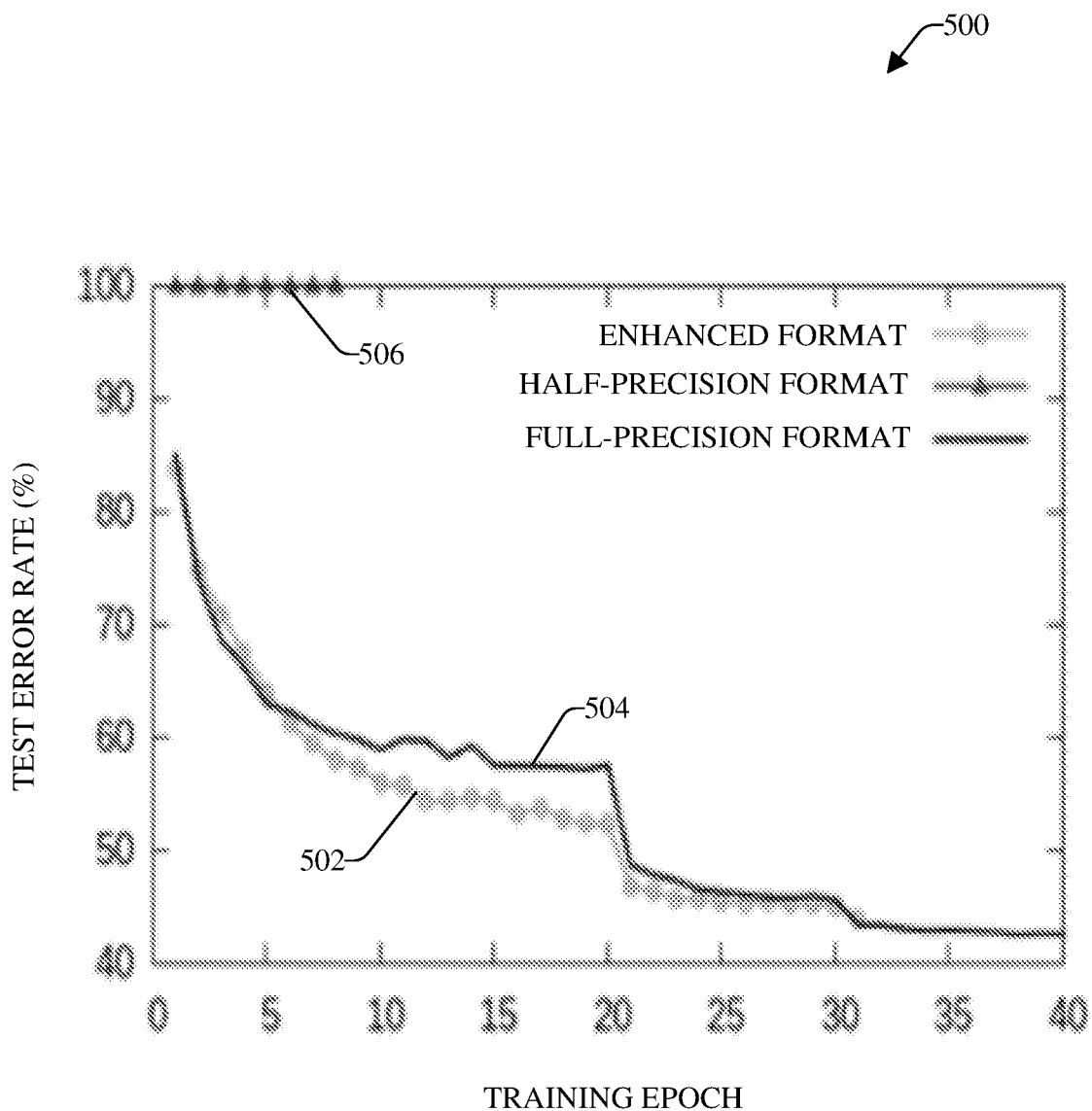
FIG. 5 illustrates a diagram of an example graph of performance results relating to image recognition, in accordance with various aspects and embodiments of the disclosed subject matter.
Figure 6:
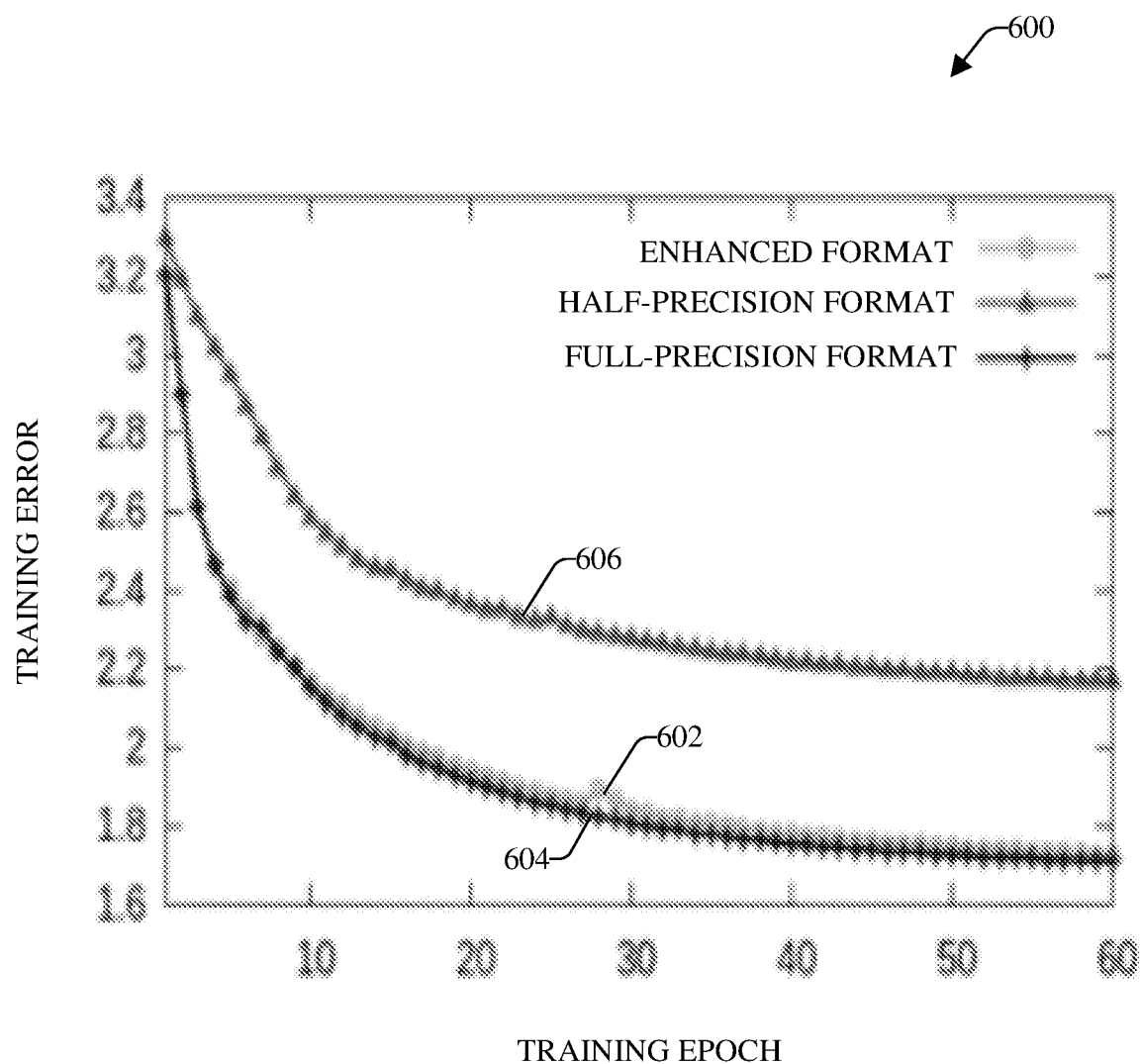
FIG. 6 depicts a diagram of an example graph of performance results relating to Shakespeare text generation, in accordance with various aspects and embodiments of the disclosed subject matter.

FIGS. 4, 5, and 6 can illustrate example performance results that can compare the performance of the enhanced floating-point number format (e.g., enhanced half-precision (e.g., 16-bit) floating-point number format) in relation to the performance results of a half-precision (e.g., 16-bit) floating-point number format (e.g., 1/5/10 format) and the performance results of a 32-bit (e.g., full-precision) floating-point number format. Referring briefly to FIG. 4, FIG. 4 depicts a diagram of an example graph 400 of performance results relating to speech recognition, in accordance with various aspects and embodiments of the disclosed subject matter. The graph 400 can illustrate respective speech recognition performance results for the enhanced floating-point number format, the half-precision floating-point number format, and the 32-bit floating-point number format, for a speech-deep neural network (speech-DNN) on a 50-hour broadcast news dataset. The graph 400 plots the phoneme error rate (%) on the y-axis with respect to the training epoch along the x-axis.

As can be observed in the graph 400 of the performance results, the speech recognition performance results 402 for the enhanced floating-point number format (enhanced format) (and associated 16-bit hardware and software) can converge quite well and can provide comparably favorable results that are relatively close to the speech recognition performance results 404 of the 32-bit floating-point number format (full-precision format) (and associated 32-bit hardware and software). Further, as can be observed from the graph 400, the speech recognition performance results 406 for the half-precision floating-point number format (half-precision format) (and associated 16-bit hardware and software) are not able to converge at all, and thus are not able to provide any meaningful speech recognition results.

FIG. 5 illustrates a diagram of an example an example graph 500 of performance results relating to image recognition, in accordance with various aspects and embodiments of the disclosed subject matter. The graph 500 can illustrate respective image recognition performance results for the enhanced floating-point number format, the half-precision floating-point number format, and the 32-bit floating-point number format, with regard to AlexNet on a 2012-ImageNet dataset, with 1K output classes. The graph 500 plots the test error (%) on the y-axis with respect to the training epoch along the x-axis.

As can be seen in the graph 500 of the performance results, the image recognition performance results 502 for the enhanced floating-point number format (and associated 16-bit hardware and software) can converge quite well and can provide results that can compare rather favorably to (e.g., results that can be substantially close to) the image recognition performance results 504 of the 32-bit floating-point number format (and associated 32-bit hardware and software). Further, as can be observed from the graph 500, the image recognition performance results 506 for the half-precision floating-point number format (and associated 16-bit hardware and software) are not able to converge at all, and thus are not able to provide any meaningful image recognition results.

With regard to FIG. 6, FIG. 6 depicts a diagram of an example graph 600 of performance results relating to Shakespeare text generation, in accordance with various aspects and embodiments of the disclosed subject matter. The graph 600 can illustrate respective text generation performance results with regard to Shakespeare text, for the enhanced floating-point number format, the half-precision floating-point number format, and the 32-bit floating-point number format, when employing a character recurrent neural network (char-RNN) with two stacked long short-term memories (LSTMs) (512 units each). The graph 600 plots the training error on the y-axis with respect to the training epoch along the x-axis.

As can be observed in the graph 600 of the performance results, the text generation performance results 602 for the enhanced floating-point number format (and associated 16-bit hardware and software) can converge quite well and can provide results that can compare quite favorably to (e.g., can be substantially close to) the text generation performance results 604 of the 32-bit floating-point number format (and associated 32-bit hardware and software). Further, as can be observed from the graph 600, the text generation performance results 606 for the half-precision floating-point number format (and associated 16-bit hardware and software), while being able to converge, are not nearly as good as the text generation performance results 602 for the enhanced floating-point number format or the text generation performance results 604 of the 32-bit floating-point number format.

Figure 7:
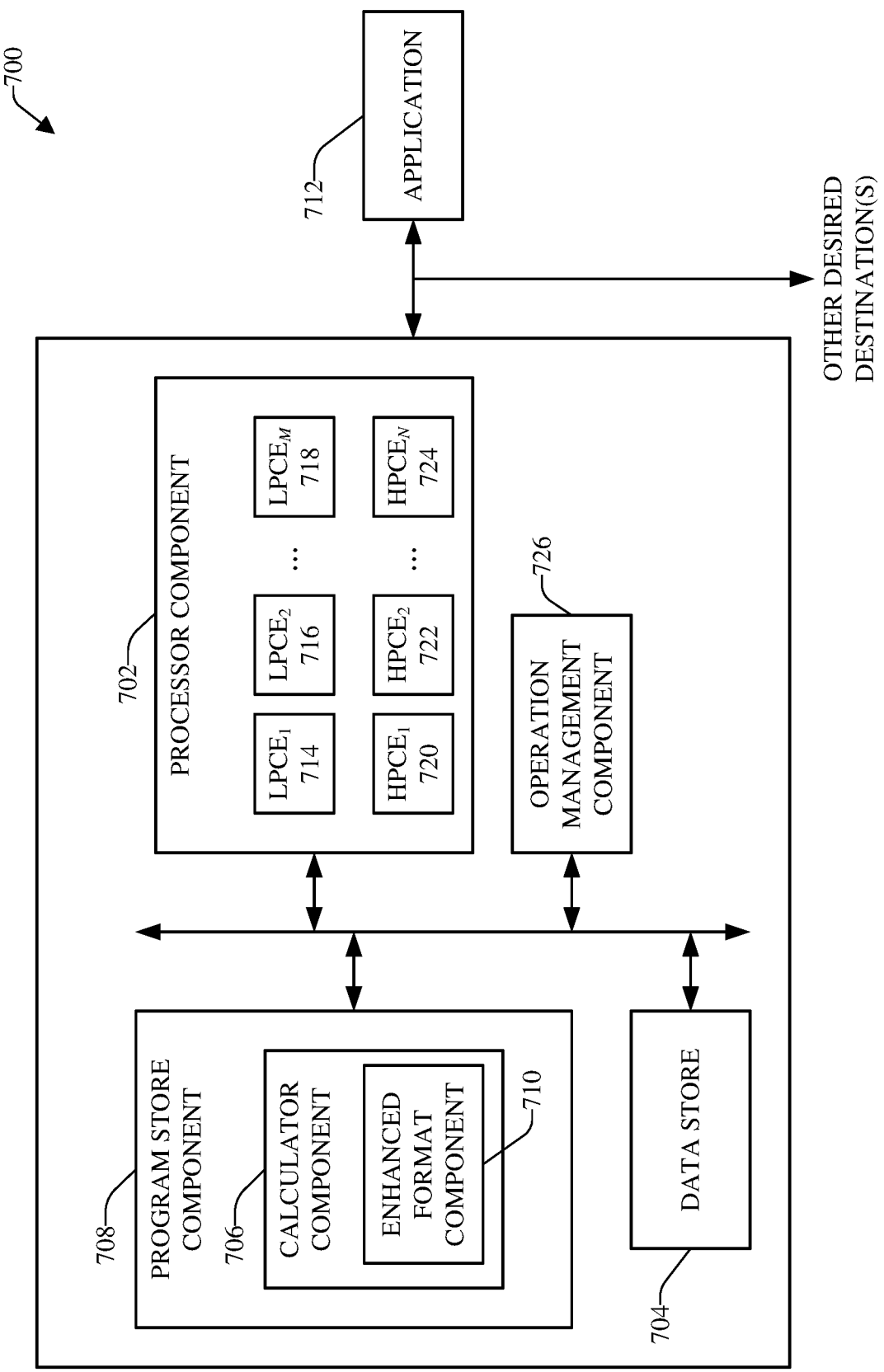
FIG. 7 depicts a block diagram of example, non-limiting system that can employ lower precision computation engines for a first portion of calculations to generate or calculate floating-point numbers using an enhanced floating-point number format and can employ higher precision computation engines for a second portion of calculations, in accordance with various aspects and embodiments of the disclosed subject matter.

Turning to FIG. 7, FIG. 7 depicts a block diagram of example, non-limiting system 700 that can employ lower precision computation engines for a first portion of calculations to generate or calculate floating-point numbers (e.g., binary floating-point numbers) using an enhanced floating-point number format and can employ higher precision computation engines for a second portion of calculations, in accordance with various aspects and embodiments of the disclosed subject matter. Repetitive description of like elements employed in other embodiments described herein is or may be omitted for sake of brevity.

The system 700 can comprise a processor component 702, a data store 704, and a calculator component 706. The processor component 702 can be associated with (e.g., communicatively connected to) the data store 704 and a program store component 708 (e.g., via a bus(es)), wherein the program store component 708 can comprise the calculator component 706. The calculator component 706 can comprise an enhanced format component 710 that can enable the processor component 702 and calculator component 706 to operate on (e.g., perform mathematical computations on), generate, and/or calculate floating-point numbers (e.g., binary floating-point numbers) in the enhanced floating-point number format, as more fully described herein.

The processor component 702 and calculator component 706 can be associated with one or more applications (e.g., machine or deep learning applications), such as application 712, to perform operations on data (e.g., numerical data) associated with the application(s) 712. For instance, the processor component 702 and/or calculator component 706 can receive data from an application 712, can operate on, generate, or determine (e.g., calculate) numerical values or results (e.g., binary floating-point numbers), based at least in part on the data, in accordance with the enhanced floating-point number format, and can provide the numerical values or results to the application 712 and/or to another desired destination (e.g., another application, component, or device).

In some embodiments, the processor component 702 can comprise a set of lower precision computation engines, such as lower precision computation engine$_1$ 714 ($LPCE_1$ 714), lower precision computation engine$_2$ 716 ($LPCE_2$ 716), up through lower precision computation engine$_M$ 718 ($LPCE_M$ 718), wherein M can be virtually any desired number. The lower precision computation engines (e.g., 714, 716, 718) of the set of lower precision computation engines can be or comprise 16-bit computation engines (e.g., 16-bit FPUs) that can perform calculations or other operations on data (e.g., numerical data) to generate floating point-numbers (e.g., binary floating-point numbers) in accordance with (e.g., that can conform to, comply with, be structured in, and/or be presented in) the enhanced floating-point number format.

The processor component 702 also can comprise a set of higher precision computation engines, such as higher precision computation engine$_1$ 720 ($HPCE_1$ 720), higher precision computation engine$_2$ 722 ($HPCE_2$ 722), up through higher precision computation engine$_N$ 724 ($HPCE_N$ 724), wherein N can be virtually any desired number. The higher precision computation engines of the set of lower precision computation engines (e.g., 720, 722, 724) can be or comprise 32-bit (and/or 64-bit) computation engines (e.g., FPUs) that can perform calculations or other operations on data (e.g., numerical data) to generate floating point-numbers (e.g., binary floating-point numbers) in accordance with (e.g., that can conform to, comply with, be structured in, and/or be presented in) a desired (e.g., suitable, acceptable, or optimal) higher precision floating-point number format.

In connection with execution or use of an application 712 (e.g., application relating to or involving machine or deep learning training), there can be a variety of different types of calculations or other operations that can be performed by the processor component 702 and/or calculator component 706. For example, some types of calculations can be relatively more sensitive to errors, such as rounding errors, than other types of calculations. In many or even most instances, the majority of the calculations associated with an application 710 can be the type of calculations that are not particularly sensitive to errors, and a relatively small portion of the calculations can be the type of calculations that can be relatively more sensitive to errors, such as rounding errors.

To facilitate efficient performance of operations, including calculations, by the processor component 702, calculator component 706 and other components of the system 700, the system 700 can comprise an operation management component 726 that can be associated with (e.g., communicatively connected to) the processor component 702, data store 704, and program store component 708. The operation management component 726 can control operations of the components of the system 700, including the processor component 702, data store 704, calculator component 706, program store component 708, the set of lower precision computation engines (e.g., 714, 716, 718), and the set of higher precision computation engines (e.g., 720, 722, 724).

For instance, to facilitate efficient performance of calculations on data (e.g., numerical data), the operation management component 726 can allocate a first portion of operations (e.g., calculation operations) and associated data to the set of lower precision computation engines (e.g., 714, 716, 718), wherein the set of lower precision computation engines can perform such operations on such data. The first portion of operations can involve performing calculations or other operations on data, wherein the calculations or other operations are not particularly sensitive to errors, such as rounding errors. The operation management component 726 also can allocate a second portion of operations (e.g., calculation operations) and associated data to the set of higher precision computation engines (e.g., 720, 722, 724), wherein the set of higher precision computation engines can perform such operations on such data. The second portion of operations can involve performing calculations or other operations on data, wherein the calculations or other operations can be the type of calculations that can be relatively more sensitive to errors, such as rounding errors, and thus, use of the higher precision calculation engines to perform these more sensitive calculations or other operations can be desirable.

As typically (e.g., frequently) there can be significantly more calculations that are not particularly sensitive to errors (e.g., the first portion of operations) than the number of calculations that can be sensitive to errors (e.g., the second portion of operations), in some embodiments, the number (e.g., M) of computation engines in the set of lower precision computation engines (e.g., 714, 716, 718) can be greater than the number (e.g., N) of computation engines in the set of higher precision computation engines (e.g., 720, 722, 724). As desired though (e.g., depending on the type of application or training tasks to be performed), in other embodiments, there can be an equal number of computation engines in the set of lower precision computation engines (e.g., 714, 716, 718) and the set of higher precision computation engines (e.g., 720, 722, 724), or the set of higher precision computation engines (e.g., 720, 722, 724) can have a higher number of computation engines than the set of lower precision computation engines (e.g., 714, 716, 718).

It is to be appreciated and understood that, in accordance with various embodiments, the system 700 can comprise one or more processor components, calculator components, lower precision computation engines, higher precision computation engines, graphics processing units (GPUs), accelerators, field-programmable gate arrays (FPGAs), and/or other processing units to perform or facilitate performing operations on data, including performing calculations on data (e.g., numerical data).

Figure 8:
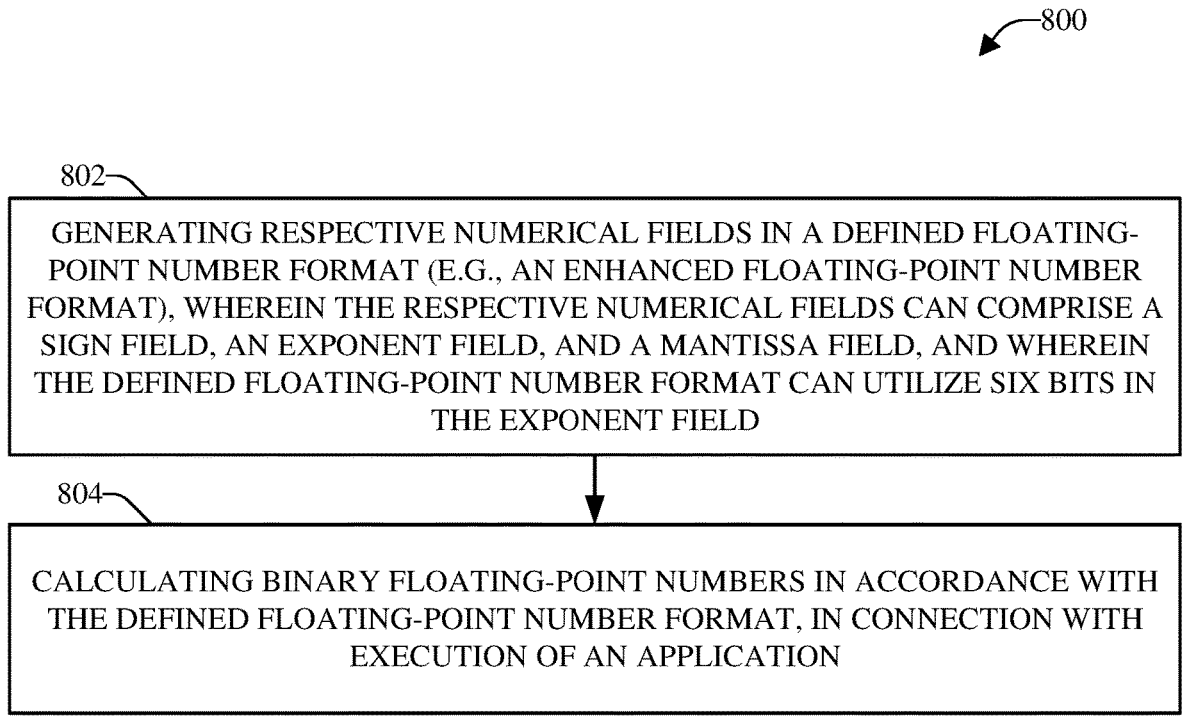
FIG. 8 illustrates a flow diagram of an example, non-limiting method for performing operations, including calculations, on data using an enhanced floating-point number format, in accordance with various aspects and embodiments of the disclosed subject matter.

FIG. 8 illustrates a flow diagram of an example, non-limiting method 800 for performing operations, including calculations, on data using an enhanced floating-point number format, in accordance with various aspects and embodiments of the disclosed subject matter. The method 800 can be performed by, for example, the processor component and/or calculator component, employing the enhanced format component. Repetitive description of like elements employed in other embodiments described herein is or may be omitted for sake of brevity.

At 802, respective numerical fields can be generated in a defined floating-point number format (e.g., an enhanced floating-point number format), wherein the respective numerical fields can comprise a sign field, an exponent field, and a mantissa field, and wherein the defined floating-point number format can utilize six bits in the exponent field. The processor component and/or calculator component can generate or facilitate generating the respective numerical fields in the defined floating-point number format.

At 804, binary floating-point numbers can be calculated in accordance with the defined floating-point number format, in connection with execution of an application. The processor component and/or calculator component can calculate or otherwise operate on the binary floating-point numbers in accordance with the defined floating-point number format, in connection with execution of an application. For example, the processor component and/or calculator component can calculate or otherwise operate on the binary floating-point numbers in accordance with the defined floating-point number format to facilitate converging a program, an algorithm (e.g., an algorithm associated with the program), and/or data points (e.g., associated with the program or algorithm) to obtain a result relating to a solution to a problem to be solved, in connection with execution of an application. The problem to be solved can relate to machine training, deep learning, cognitive computing, artificial intelligence, neural networks, and/or other computing-intensive tasks, problems, or applications. For instance, the problem can relate to image recognition to recognize or identify objects (e.g., person, place, and/or thing) in an image, speech recognition to recognize or identify words and/or identities of voices in audio content, or textual recognition to recognize or identify textual data (e.g., words, alphanumeric characters) in textual content (e.g., book, manuscript, email, . . . ).

Figure 9:
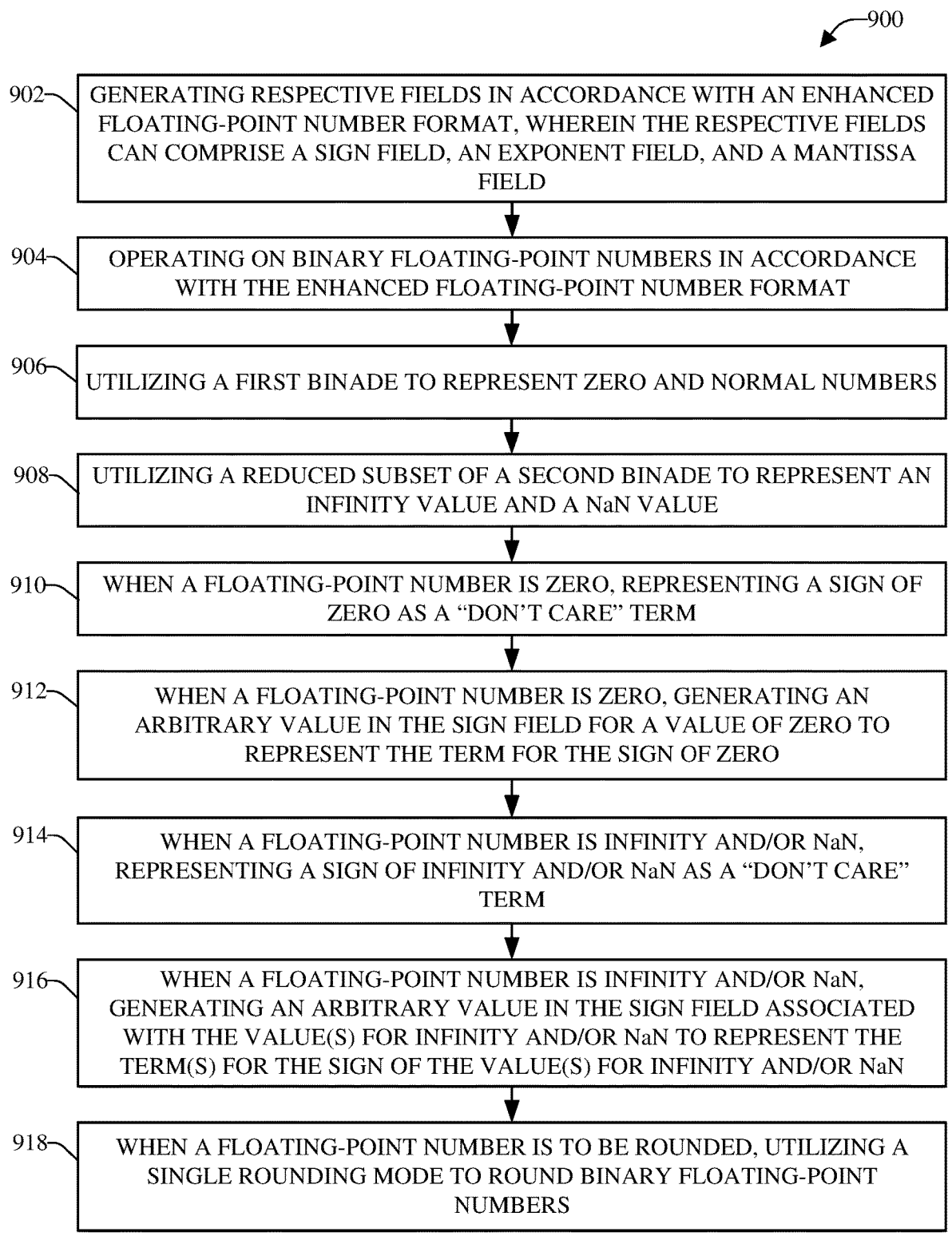
FIG. 9 depicts a flow diagram of another example, non-limiting method for performing operations, including calculations, on data using an enhanced floating-point number format, in accordance with various aspects and embodiments of the disclosed subject matter.

FIG. 9 depicts a flow diagram of another example, non-limiting method 900 for performing operations, including calculations, on data using an enhanced floating-point number format, in accordance with various aspects and embodiments of the disclosed subject matter. The method 900 can be performed by, for example, the processor component and/or calculator component, employing the enhanced format component. Repetitive description of like elements employed in other embodiments described herein is or may be omitted for sake of brevity.

At 902, respective fields can be generated in accordance with an enhanced floating-point number format, wherein the respective fields can comprise a sign field, an exponent field, and a mantissa field. The processor component and/or calculator component can generate or facilitate generating the respective fields in the enhanced floating-point number format. The defined floating-point number format can be a 16-bit format, wherein the sign field can include a single bit, the exponent field can comprise six bits, and the mantissa field can comprise nine bits.

At 904, binary floating-point numbers can be operated on in accordance with the enhanced floating-point number format. The processor component and/or calculator component can operate on, generate, and/or calculate the binary floating-point numbers in accordance with the enhanced floating-point number format, for example, to facilitate converging a program associated with an application, in accordance with the defined convergence criteria. The defined convergence criteria can relate to, for example, an amount of time for the program (e.g., algorithm and/or data points of the program) to converge to obtain a result to a problem that is to be solved in connection with execution of the application, an achievability of the program to converge to obtain the result, and/or an error rate associated with the result.

At 906, a first binade can be utilized to represent zero and normal numbers, in accordance with the enhanced floating-point number format, wherein the first binade is associated with the exponent field having all zeros. The processor component and/or calculator component can utilize the first binade to represent zero and normal numbers, in accordance with the enhanced floating-point number format. The first binade can be the lowest binade, for example. The first binade can comprise a set of data points, wherein a data point of the set that has a fraction of all zeros can represent zero. The other data points of the set of data points can represent normal numbers.

Normal numbers can be finite non-zero floating-point numbers with a magnitude greater than or equal to a minimum value that can be determined as a function of a base and a minimum exponent associated with the enhanced floating-point number format. For example, a normal number can be a finite non-zero floating-point number with a magnitude greater than or equal to $r^{min(e)}$, wherein r can be the radix and min(e) can be the minimum exponent. The enhanced floating-point number format can be structured to not use, to not include, or to eliminate, subnormal numbers.

At 908, a reduced subset of a second binade can be utilized to represent an infinity value and a NaN value, in accordance with the enhanced floating-point number format. The processor component and/or calculator component can utilize the reduced subset of the second binade to represent the infinity value and the NaN value, in accordance with the enhanced floating-point number format. The second binade can be the highest binade, for example, wherein the second binade can be associated with all of the bits of the exponent field having values of one.

The enhanced floating-point format can be structured to utilize a reduced (e.g., smaller) subset of data points of a set of data points of the second binade to represent the infinity value and the NaN value. The reduced set of data points can comprise less data points than a set of data points associated with an entirety of the second binade. In some embodiments, the enhanced floating-point format can be structured to utilize a single data point of the set of data points of the second binade to represent both the infinity value and the NaN value as a single merged symbol. That is, the reduced subset of data points can have a single data point that can represent the single merged symbol for the infinity value and the NaN value. In other embodiments, the reduced subset of data points can comprise a data point that can represent the infinity value and another data point that can represent the NaN value. The other data points of the set of data points of the second binade that are not in the reduced set of data points can be used to represent finite numbers, which can further enhance or extend the range of floating-point numbers that can be represented using the enhanced floating-point number format.

At 910, when a floating-point number is zero, a sign of zero can be represented as a "don't care" term, in accordance with the enhanced floating-point number format. When a floating-point number is zero, the processor component and/or calculator component can represent the sign of zero as a "don't care" term, in accordance with the enhanced floating-point number format. The "don't care" term can be a term or symbol that can indicate that the sign does not matter with respect to the zero value.

At 912, when a floating-point number is zero, an arbitrary value can be generated in the sign field for a value of zero to represent the term for the sign of zero. The processor component and/or calculator component can generate the arbitrary value in the sign field to represent the term or symbol for the sign of the value of zero, for example, when zero is the floating-point number. The processor component and/or calculator component can generate any arbitrary value or symbol in the sign field of the enhanced floating-point number format that is convenient or efficient (e.g., most convenient or most efficient) for the processor component or calculator component to generate and insert in the sign field. For example, the processor component and/or calculator component can generate an arbitrary value that can utilize the least amount of resources (e.g., processing or computing resources) or at least can utilize less resources than would otherwise be used to determine and generate a non-arbitrary value for the sign field to represent the sign of the value of zero.

At 914, when a floating-point number is infinity and/or NaN, a sign of infinity and/or NaN can be represented as a "don't care" term, in accordance with the enhanced floating-point number format. When a floating-point number is infinity and/or NaN, the processor component and/or calculator component can represent the sign of infinity and/or NaN as a "don't care" term, in accordance with the enhanced floating-point number format. The "don't care" term can be a term or symbol that can indicate that the sign does not matter with respect to the infinity value and/or NaN value. In some embodiments, the infinity value and the NaN value can be represented as a merged symbol. In other embodiments, the infinity value and the NaN value can be represented individually.

At 916, when a floating-point number is infinity and/or NaN, an arbitrary value can be generated in the sign field associated with the value(s) for infinity and/or NaN to represent the term(s) for the sign of the value(s) for infinity and/or NaN. The processor component and/or calculator component can generate the arbitrary value in the sign field associated with the value(s) for infinity and/or NaN to represent the term or symbol for the sign of the value of the value(s) for infinity and/or NaN, for example, when infinity or NaN is the floating-point number result. As described herein, in some embodiments, the infinity value and NaN value can be represented as a merged symbol, and in other embodiments, the infinity value and the NaN value can be represented individually.

In accordance with the enhanced floating-point number format, the processor component and/or calculator component can generate any arbitrary value or symbol in the sign field associated with the value(s) for infinity and/or NaN that is convenient or efficient (e.g., most convenient or most efficient) for the processor component or calculator component to generate and insert in such sign field. For example, the processor component and/or calculator component can generate an arbitrary value that can utilize the least amount of resources (e.g., processing or computing resources) or at least can utilize less resources than would otherwise be used to determine and generate a non-arbitrary value for the sign field to represent the sign of the value(s) for infinity and/or NaN.

At 918, when a floating-point number is to be rounded, a single rounding mode can be utilized for rounding binary floating-point numbers, in accordance with the enhanced floating-point number format. When rounding of numbers is desired, the processor component and/or calculator component can perform rounding intermediate binary floating-point numbers (e.g., preliminary calculated number values) using the single rounding mode to perform rounding the intermediate binary floating-point numbers to facilitate operating on or calculating the binary floating-point numbers, in accordance with the defined floating-point number format. In some embodiments, the single rounding mode can be a round-nearest-up mode. The disclosed subject matter, by utilizing only the round-nearest-up mode to perform rounding on floating-point numbers can improve efficiency by reducing hardware (e.g., the amount and/or type of hardware or hardware resources) utilized to execute the application and operate on or calculate the binary floating-point numbers.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 10:
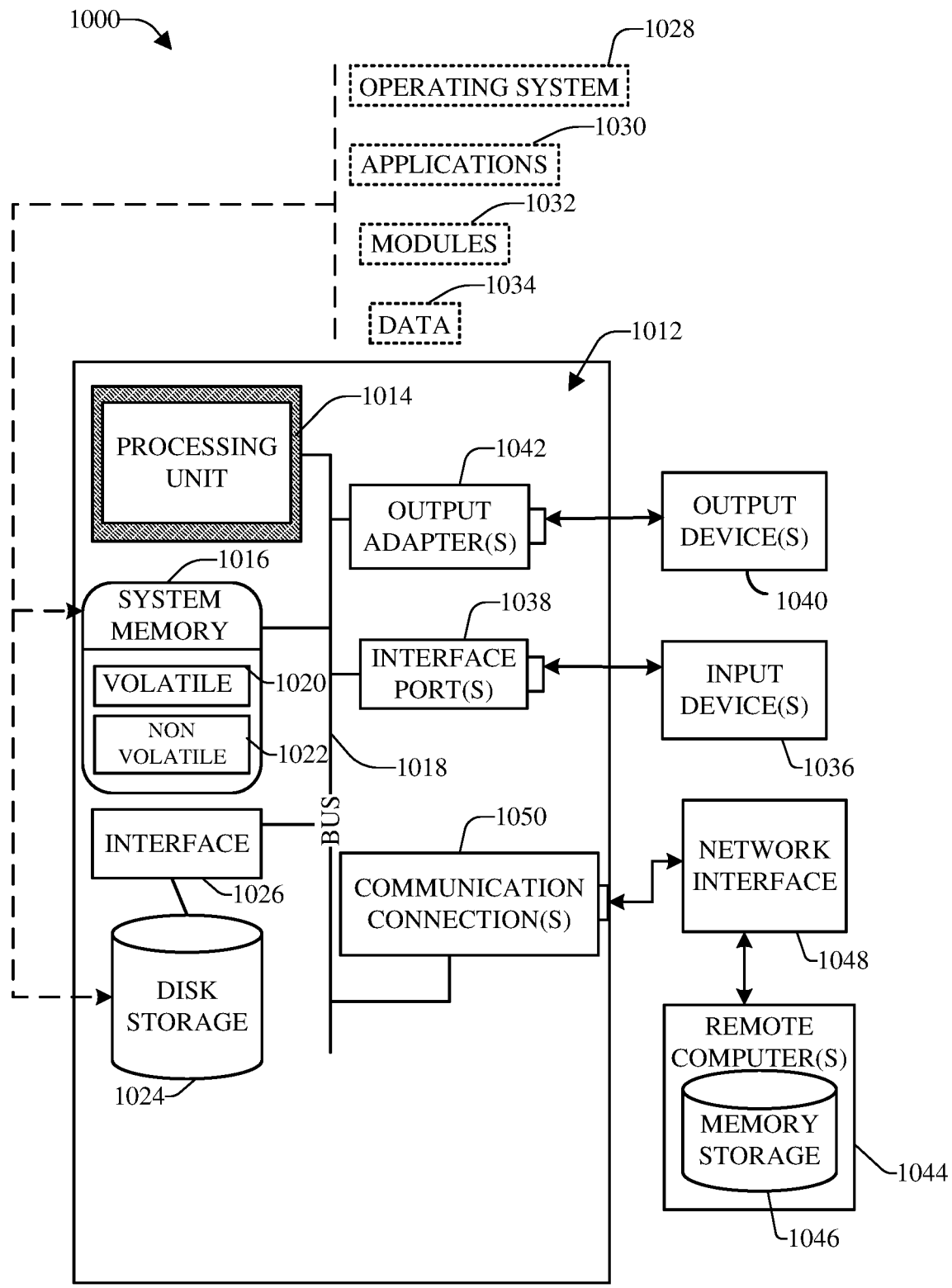
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is or may be omitted for sake of brevity. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/nonvolatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a method of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

One or more embodiments may be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor, operatively coupled to the memory, that executes computer-executable components, the computer-executable components comprising:
   a calculator component that facilitates operation on and calculation of binary floating-point numbers by the processor in accordance with a defined 16-bit floating-point number format, in connection with execution of a machine learning application,
   wherein the defined 16-bit floating-point number format utilizes greater than five bits in an exponent field,
   wherein the defined 16-bit floating-point number format utilizes a first binade to represent zero and normal numbers, wherein the first binade is associated with the exponent field having all zeros, and wherein a normal number of the normal numbers is a finite non-zero floating-point number with a magnitude greater than or equal to a minimum value that is determined as a function of a radix and a minimum exponent associated with the defined 16-bit floating-point number format, and
   wherein the defined 16-bit floating-point number format is applied to the machine learning application and results in reduced error rates and improved convergence time;
   an operation management component operatively coupled to the calculator component and the processor, wherein the operation management component:
   allocates a first portion of operations of the calculator component and associated data to a set of lower precision computation engines; and
   an enhanced format component that generates the defined 16-bit floating-point number format employed by the processor and the calculator component to calculate the binary floating-point numbers.

2. The system of claim 1, wherein the defined 16-bit floating-point number format utilizes six bits in the exponent field and facilitates the machine learning algorithm and deep learning training algorithms, and wherein the exponent field is adjacent a sign field comprising one bit of data representing a sign of the floating-point number.

3. The system of claim 2, wherein the calculator component generates an arbitrary value or symbol in the sign field of the defined 16-bit floating-point number format to reduce hardware complexity and based on a generation of a zero result for a binary floating-point number of the binary floating-point numbers.

4. The system of claim 1, wherein the operation management component also allocates a second portion of the operations of the calculator component and second associated data to a set of higher precision computation engines.

5. The system of claim 1, wherein the set of lower precision computation engines comprises computation engines comprising 16-bit floating-point units, and wherein the set of higher precision computation engines comprises computation engines comprising 32-bit floating-point units or 64-bit floating-point units.

6. The system of claim 1, wherein the defined 16-bit floating-point number format comprises a 1/6/9 format having a single sign bit, a six bit exponent and a nine bit mantissa, wherein the processor employs the defined 16-bit floating-point number format as an arithmetic computation format as well as a data-interchange format.

7. The system of claim 1, wherein the defined 16-bit floating-point number format defines a sign of zero as being a don't care term for selected ones of defined applications, the defined applications comprising deep learning applications or machine learning applications.

8. The system of claim 1, wherein a data point of the first binade has a fraction of all zeros and represents zero, and other data points of the first binade represent the normal numbers.

9. The system of claim 1, wherein the defined 16-bit floating-point number format utilizes a second binade associated with the exponent field having all ones, wherein the defined floating-point number format employs a reduced set of data points in the second binade to represent an infinity value and a not-a-number value, and wherein the reduced set of data points comprises less data points than a set of data points associated with an entirety of the second binade.

10. The system of claim 1, wherein, in accordance with the defined 16-bit floating-point number format, the calculator component represents a sign of a value of zero as a term that indicates that the sign does not matter with respect to the value of zero, wherein the processor generates an arbitrary value in a sign field of the defined 16-bit floating-point number format to represent the term, and wherein the generation of the arbitrary value utilizes less resources than a determination and a generation of a non-arbitrary value for the sign field.

11. The system of claim 1, wherein, in accordance with the defined 16-bit floating-point number format, the calculator component represents a not-a-number value and an infinity value together as a merged symbol, wherein the calculator component represents a sign of the merged symbol as a term that indicates that the sign does not matter with respect to the merged symbol, wherein the processor generates an arbitrary value in a sign field of the defined floating-point number format to represent the term, and wherein the generation of the arbitrary value utilizes less resources than a determination and a generation of a non-arbitrary value for the sign field.

12. The system of claim 1, wherein, in accordance with the defined 16-bit floating-point number format, the calculator component utilizes only one rounding mode to perform rounding values of the binary floating-point numbers, to facilitate enhancing efficiency of the system by reducing hardware utilized to execute the application and to operate on and calculate the binary floating-point numbers, and wherein the one rounding mode is a round-nearest-up mode.

13. A computer-implemented method, comprising:
generating, by a system operatively coupled to a processor, respective numerical fields in a defined 16-bit floating-point number format, wherein the respective numerical fields comprise a sign field, an exponent field, and a mantissa field, wherein the defined 16-bit floating-point number format utilizes greater than five bits in the exponent field, and wherein the defined 16-bit floating-point number format utilizes a first binade to represent zero and normal numbers, wherein the first binade is associated with the exponent field having all zeros, and wherein a normal number of the normal numbers is a finite non-zero floating-point number with a magnitude greater than or equal to a minimum value that is determined as a function of a radix and a minimum exponent associated with the defined 16-bit floating-point number format;
calculating, by the system, binary floating-point numbers in accordance with the defined 16-bit floating-point number format, in connection with execution of a deep learning application, wherein the defined 16-bit floating-point number format is applied to the deep learning application and results in reduced error rates and improved convergence time; and
allocating, by the system, a first portion of operations of the calculator component and associated data to a set of lower precision computation engines.

14. The computer-implemented method of claim 13, wherein the defined 16-bit floating-point number format utilizes six bits in the exponent field that facilitates machine learning algorithms and deep learning training algorithms, and wherein the exponent field is adjacent a sign field comprising one bit of data representing a sign of the floating-point number.

15. The computer-implemented method of claim 14, further comprising:
generating, by the system, an arbitrary value or symbol in the sign field of the defined 16-bit floating-point number to reduce hardware complexity and based on a generation of a zero result for a binary floating-point number of the binary floating-point numbers.

16. The computer-implemented method of claim 13, further comprising:
allocating, by the system, a second portion of the operations of the calculator component and second associated data to a set of higher precision computation engines.

17. The computer-implemented method of claim 16, wherein the set of lower precision computation engines comprises computation engines comprising 16-bit floating-point units, and wherein the set of higher precision computation engines comprises computation engines comprising 32-bit floating-point units or 64-bit floating-point units.

18. A computer program product that facilitates calculating floating-point numbers, the computer program product comprising a computer readable storage medium having program instructions embodied therewith, the program instructions are executable by a processor to cause the processor to:
create respective fields in a defined 16-bit floating-point number format, wherein the respective fields comprise a sign field, an exponent field, and a fraction field, wherein the defined 16-bit floating-point number format contains six bits for the exponent in the exponent field, and wherein the defined 16-bit floating-point number format utilizes a first binade to represent zero and normal numbers, wherein the first binade is associated with the exponent field having all zeros, and wherein a normal number of the normal numbers is a finite non-zero floating-point number with a magnitude greater than or equal to a minimum value that is determined as a function of a radix and a minimum exponent associated with the defined 16-bit floating-point number format; and
calculate the floating-point numbers in accordance with the defined 16-bit floating-point number format, in connection with utilization of a machine learning application, wherein the defined floating-point number format is applied to the machine learning application and results in reduced error rates and improved convergence time.

19. The computer program product of claim 18, wherein the defined 16-bit floating-point number format utilizes six bits in the exponent field facilitates machine learning algorithms and deep learning training algorithms, and wherein the exponent field is adjacent a sign field comprising one bit of data representing a sign of the floating-point number.

20. The computer program product of claim 19, wherein the program instructions are further executable by the processor to cause the processor to:
generate an arbitrary value or symbol in the sign field of the defined 16-bit floating-point number to reduce hardware complexity and based on a generation of a zero result for a binary floating-point number of the binary floating-point numbers.

\* \* \* \* \*